(12) United States Patent
Roskamp et al.

(10) Patent No.: US 12,188,235 B2
(45) Date of Patent: Jan. 7, 2025

(54) SEALING DEVICE WITH A WELDABLE FIBER-BASED LAYER

(71) Applicant: SIKA TECHNOLOGY AG, Baar (CH)

(72) Inventors: Robert Roskamp, Altdorf (CH); Simon Schoenbrodt, Sarnen (CH); Armin Flueck, Kerns (CH); Oliver Knebel, Lucerne (CH)

(73) Assignee: SIKA TECHNOLOGY AG, Baar (CH)

( * ) Notice: Subject to any disclaimer, the term of this patent is extended or adjusted under 35 U.S.C. 154(b) by 861 days.

(21) Appl. No.: 17/270,267

(22) PCT Filed: Oct. 24, 2019

(86) PCT No.: PCT/EP2019/079110
§ 371 (c)(1),
(2) Date: Feb. 22, 2021

(87) PCT Pub. No.: WO2020/084096
PCT Pub. Date: Apr. 30, 2020

(65) Prior Publication Data
US 2021/0317663 A1    Oct. 14, 2021

(30) Foreign Application Priority Data

Oct. 25, 2018    (EP) ..................................... 18202723

(51) Int. Cl.
*E04D 5/10*         (2006.01)
*B32B 5/02*         (2006.01)
(Continued)

(52) U.S. Cl.
CPC ................ *E04D 5/10* (2013.01); *B32B 5/022* (2013.01); *B32B 25/10* (2013.01); *B32B 25/18* (2013.01);
(Continued)

(58) Field of Classification Search
CPC ......... B32B 5/022; B32B 25/10; B32B 25/18; B32B 27/12; B32B 27/32;
(Continued)

(56) References Cited

U.S. PATENT DOCUMENTS

| | | | | |
|---|---|---|---|---|
| 4,457,983 A * | 7/1984 | Maile | ..................... | B32B 11/10 428/522 |
| 4,615,934 A * | 10/1986 | Ellison | ..................... | B29C 70/22 66/190 |
| 5,687,517 A * | 11/1997 | Wiercinski | .............. | B32B 27/08 52/783.17 |
| 6,764,733 B1 * | 7/2004 | Clarke | ..................... | E04D 5/10 52/90.2 |
| 6,864,195 B2 | 3/2005 | Peng | | |
| 8,793,862 B2 * | 8/2014 | Weber | ..................... | B32B 3/10 428/411.1 |

(Continued)

FOREIGN PATENT DOCUMENTS

WO    2018/122113 A1    7/2018

*Primary Examiner* — Adriana Figueroa
(74) *Attorney, Agent, or Firm* — Oliff PLC (57) ABSTRACT

A sealing device including a waterproofing layer including at least one thermoplastic elastomer P1 and an outer layer of non-woven fabric directly adhered to at least portion of the second major surface of the waterproofing layer, wherein the outer layer of non-woven fabric including at least one polymer P2. Further, a method for producing a sealing device, to the use of a layer of non-woven fabric including or essentially consisting of polypropylene fibers for reducing blocking of a waterproofing layer including at least one propylene-based thermoplastic elastomer, and to a method for covering a roof substrate using the sealing devices of the present invention.

18 Claims, 2 Drawing Sheets

(51) Int. Cl.
  *B32B 25/10* (2006.01)
  *B32B 25/18* (2006.01)
  *B32B 27/12* (2006.01)
  *B32B 27/32* (2006.01)

(52) U.S. Cl.
  CPC .............. *B32B 27/12* (2013.01); *B32B 27/32* (2013.01); *B32B 2262/0253* (2013.01); *B32B 2270/00* (2013.01); *B32B 2307/31* (2013.01); *B32B 2307/718* (2013.01); *B32B 2307/7265* (2013.01); *B32B 2419/06* (2013.01)

(58) Field of Classification Search
  CPC ........ B32B 2262/0253; B32B 2270/00; B32B 2307/31; B32B 2307/718; B32B 2307/7265; B32B 2419/06; E04D 5/10
  See application file for complete search history.

(56) References Cited

U.S. PATENT DOCUMENTS

| | | | |
|---|---|---|---|
| 9,650,549 B2 * | 5/2017 | Ackermann | B32B 37/16 |
| 10,759,150 B2 * | 9/2020 | Knebel | C09J 7/30 |
| 10,919,283 B2 * | 2/2021 | Keiser | B32B 27/20 |
| 11,065,849 B2 * | 7/2021 | Ackermann | B32B 7/02 |
| 11,459,761 B2 * | 10/2022 | Ackermann | B32B 27/08 |
| 2001/0003625 A1 * | 6/2001 | Apgar | E04D 5/12 |
| | | | 428/57 |
| 2013/0260118 A1 * | 10/2013 | Lunghi | B32B 27/32 |
| | | | 428/339 |
| 2014/0248466 A1 * | 9/2014 | Rudolf | E04D 5/12 |
| | | | 156/60 |
| 2015/0231863 A1 | 8/2015 | Knebel et al. | |
| 2019/0112814 A1 * | 4/2019 | Robles-Ramos | B32B 5/022 |
| 2021/0016544 A1 * | 1/2021 | Robles-Ramos | B32B 27/302 |

* cited by examiner

SEALING DEVICE WITH A WELDABLE FIBER-BASED LAYER

TECHNICAL FIELD

The invention relates to the field of waterproofing of underground and above ground building constructions by using polymeric sealing devices. In particular, the invention relates to roofing membranes, which can be used for providing single- or multi-ply roof systems.

BACKGROUND OF THE INVENTION

In the field of construction polymeric sheets, which are often referred to as membranes or panels, are used to protect underground and above ground constructions, such as basements, tunnels, and flat and low-sloped roofs, against penetration of water. Waterproofing membranes are applied, for example, to prevent ingress of water through cracks that develop in the concrete structure due to building settlement, load deflection or concrete shrinkage. Roofing membranes used for waterproofing of flat and low-sloped roof structures are typically provided as single-ply or multi-ply membrane systems. In a single-ply system, the roof substrate is covered using a roofing membrane composed of single barrier layer, which can be mechanically stabilized with a reinforcement layer, typically a layer of fiber material. In multi-ply systems, a roofing membrane composed of multiple layers of different or similar materials is used. Single-ply roofing membranes have the advantage of lower production costs compared to the multi-ply membranes but they are also less resistant to mechanical damages caused by punctures of sharp objects. Waterproofing membranes are typically provided as single-ply systems.

Commonly used materials for waterproofing and roofing membranes include plastics, in particular thermoplastics such as plasticized polyvinylchloride (p-PVC), thermoplastic polyolefins (TPO, TPE-O), and elastomers such as ethylene-propylene diene monomer (EPDM). TPOs are heterophase polyolefin compositions containing a high crystallinity base polyolefin and a low-crystallinity or amorphous polyolefin modifier. Waterproofing membranes based on crosslinked EPDM are very flexible and resistant to weathering but they are not heat-weldable due to the chemically crosslinked structure. Membranes composed of TPOs are heat-weldable and less expensive than EPDM-membranes but they are also more rigid, which is can be a disadvantage in some applications. Membranes based on plasticized PVC are more flexible than TPO membranes but they also contain environmentally harmful plasticizers and heavy metal additives such as flame retardants that may restrict their use in some applications. The membranes are typically delivered to a construction site in form of rolls, transferred to the place of installation, unrolled, and adhered to the substrate to be waterproofed. The substrate on which the membrane is adhered may be comprised of variety of materials depending on the installation site. The substrate may, for example, be a concrete, metal, or wood deck, or it may include an insulation board or recover board and/or an existing membrane.

Various approaches have been suggested to provide a TPO-membrane with increased flexibility. One of these is based on using multilayer membrane systems comprising a flexible EPDM-based core layer with top and bottom TPO-based layers. Another approach has been to develop new TPO-compositions comprising increased amount of the low-crystallinity or amorphous polyolefin modifier. However, increasing the rubber content of a TPO typically results in compositions having increased tackiness. Consequently, membranes produced using such these types of compositions have been found out to exhibit increased blocking, which complicates various post-processing steps of the membranes such as cutting, welding, stacking, and unwinding from a roll. Blocking refers here to the increased adhesion of two adjacent polymeric layers, which results from the presence of van der Waals forces between amorphous regions of the polymer components. Roofing membranes must be securely fastened to the roof substrate to provide sufficient mechanical strength to resist the shearing forces applied on it due to high wind loads. Roof systems are typically divided into two categories depending on the means used for fastening the roofing membrane to the roof substrate. In a mechanically attached roof system, the roofing membrane is fastened to the roof substrate by using screws and/or barbed plates. Mechanical fastening enables high strength bonding but it provides direct attachment to the roof substrate only at locations where a mechanical fastener affixes the membrane to the surface, which makes mechanically attached membranes susceptible to flutter. In fully-adhered roof systems the membrane is typically adhered to the roof substrate indirectly by using an adhesive composition.

Roofing and waterproofing membranes can be adhesively adhered to substrates to be waterproofed by using a number of techniques including contact bonding and using self-adhering membranes. In contact bonding both the membrane and the surface of the roof substrate are first coated with a solvent or water based contact adhesive after which the membrane is contacted with the surface of the substrate. The volatile components of the contact adhesive are "flashed off" to provide a partially dried adhesive film prior to contacting the membrane with the substrate. A fully-adhered membrane system can also be prepared by using self-adhering membranes having a pre-applied layer of adhesive composition coated on one of the exterior surfaces of the membrane. Typically the pre-applied adhesive layer is covered with a release liner to prevent premature unwanted adhesion and to protect the adhesive layer from moisture, fouling, and other environmental factors. At the time of use the release liner is removed and the roofing membrane is secured to the substrate without using additional adhesives. Membranes having a pre-applied adhesive layer covered by release liner are also known as "peel and stick membranes".

Furthermore, adjoining membranes are typically overlapped along the length of the membrane at the selvage edge in order to create a continuous waterproofing seal on the surface of the substrate to be waterproofed. The opposing surfaces of the overlapping portions are then bonded to each other by using an adhesive ("bonded seams") or by heat-welding ("welded seams"). The choice between bonded and welded seams depends on the composition of the membranes. TPO-membranes are non-crosslinked and, therefore, the overlapping portions can be bonded to each other by heat-welding. On the other hand, the joints between adjacent crosslinked EPDM-membranes must be sealed by adhesive bonding or by using sealing tapes.

The State-of-the-Art TPO-based waterproofing and roofing membranes typically comprise a layer of fiber material on the back side of the membrane to enable adhesive bonding of the membrane to a substrate to be waterproofed. These types of membranes are often characterized as "fleece-backed" even though the layer of fiber material adhered on the back side of the membrane can be any type of non-woven fabric, such as a felt. The layer of fiber material is used to provide a connecting layer between the substrate and the membrane since TPOs are relatively non-polar and, therefore, are difficult to bond with typical adhesives commonly used in the field of construction. The layer of fiber material is typically composed of polyester fibers, which provide good bonding with most of the adhesives used for providing fully adhered roofing and waterproofing systems.

Due to the presence of the polyester-based fiber layer, the overlapping portions of adjacent membranes cannot be bonded to each other by heat-welding. Therefore, the fleece-backed membranes are usually provided with selvedge edges that are left free of the fleece-backing in order to provide a heat-weldable seam. The disadvantage of this approach is that the presence of the selvedge edges increases the production cost of the membranes. Furthermore, membranes can basically be provided only with longitudinal selvedge edges since the transverse edges ("cut edges") are only formed when the membrane product provided in a form of rolls is cut to a certain length at the construction site. Consequently, even in case the membrane is provided with longitudinal selvedge edges, some of the seams formed between overlapping portions of adjacent membranes have to be sealed by adhesive bonding and/or by using sealing tapes, which increases the installation costs.

There thus remains a need for a novel type of TPO-based roofing membrane, which can be produced at lower costs compared to the State-of-the-Art fleece-backed membranes and which enables forming waterproofing coverings, in which all seams formed between overlapping edges of adjacent membranes can be sealed by heat-welding.

SUMMARY OF THE INVENTION

The object of the present invention is to provide a sealing device, which can be used for sealing of underground and above ground constructions against penetration of water and wherein seams formed between overlapping edges of adjacent membranes can be sealed by heat-welding.

Another object of the present invention is to provide a sealing device comprising a flexible TPO-based waterproofing layer exhibiting reduced blocking. Such sealing devices can be stored in form of rolls for long periods of time even at elevated temperatures without the adjacent layers of the membrane sticking to each other and thus enabling unproblematic unwinding from a roll.

The subject of the present invention is a sealing device as defined in claim 1.

It was surprisingly found out that a sealing device comprising a waterproofing layer comprising at least one thermoplastic elastomer P1 and an outer layer of non-woven fabric directly adhered to one on of the exterior surface of the waterproofing layer, wherein the outer layer of non-woven fabric comprises or essentially consists of fibers comprising at least one polymer P2, and wherein the at least one thermoplastic elastomer P1 and the at least one polymer P2 are preferably compatible and/or at least partially miscible with each other, is able to solve or at least mitigate the problems of the State-of-the-Art fleece-backed waterproofing and roofing membranes.

In particular, it was surprisingly found out that when the polymer basis of the waterproofing layer and the outer layer of non-woven fabric is chosen to be compatible and/or at least partially miscible with each other, the welding properties of the sealing device are preserved despite the presence of the fiber based layer. It has also been surprisingly discovered that overlapping portions of the sealing devices of the present invention can be bonded to each other by heat welding and that the thus obtained welded joint fulfills the requirements as set forth in the UEAtc Technical Guide for the assessment of non-reinforced, reinforced and/or backed roof waterproofing systems made of FPO, December 2001. According to the UEAtc Technical Guide, the welded joint is generally considered satisfactory when in a tear testing, a break occurs outside of the welding seam between the joined layers.

Furthermore, it was surprisingly found out that the use of the outer layer of non-woven fabric also enables providing a sealing device comprising a flexible TPO-based waterproofing layer, which sealing devices can be stored in form of rolls even at elevated temperatures without exhibiting blocking of the adjacent layers.

One of the advantages of the sealing device of the present invention is that it enables providing fleece-backed waterproofing and roofing membranes with decreased costs compared to the State-of-the-Art solutions.

Another advantage of the sealing device of the present invention is that enables providing waterproofing and roofing systems, in which all the seams formed between overlapping edges of adjacent membranes can be sealed by heat welding.

Still another advantage of the sealing device of the present invention is that is enables providing TPO-based waterproofing and roofing membranes having increased flexibility and reduced blocking compared to State-of-the-Art TPO-based membranes.

Other aspects of the present invention are presented in other independent claims. Preferred aspects of the invention are presented in the dependent claims.

DETAILED DESCRIPTION OF THE INVENTION

The subject of the present invention is a sealing device (1) comprising:

i) A waterproofing layer (2) having a first and a second major surface and comprising at least one thermoplastic elastomer P1 and
ii) An outer layer of non-woven fabric (3) directly adhered over at least part of its surface to the second major surface of the waterproofing layer (2),
wherein the outer layer of non-woven fabric (3) comprises at least one polymer P2.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" designates a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "thermoplastic elastomer" designates a polymer or a polymer blend, which above its melting point ($T_m$) exhibits a thermoplastic character that enables it to be shaped into a fabricated article and which exhibits elastomeric behavior over a specified "design temperature range". Thermoplastic elastomers (TPE) include a class of copolymers and blends of thermoplastic and elastomeric compounds, which can be provided as physical blends or reactor blends. Commercially available thermoplastic elastomers include, for example, thermoplastic polyolefins (TPO, TPE-O), styrenic block copolymers (TPS), thermoplastic vulcanizates, (TPV), thermoplastic polyurethanes (TPU), thermoplastic copolyesters (TPC), and thermoplastic polyamides (TPA).

The term "elastomer" designates a polymer or a polymer blend, which is capable of recovering from large deformations, and which can be, or already is, modified to a state in which it is essentially insoluble (but can swell) in a boiling solvent, in particular xylene. Typical elastomers are capable of being elongated or deformed to at least 200% of their original dimension under an externally applied force, and will substantially resume the original dimensions, sustaining only small permanent set (typically no more than about 20%), after the external force is released. As used herein, the term "elastomer" may be used interchangeably with the term "rubber."

The term "molecular weight" refers to the molar mass (g/mol) of a molecule or a part of a molecule, also referred to as "moiety". The term "average molecular weight" refers to the number average molecular weight ($M_n$) of an oligomeric or polymeric mixture of molecules or moieties. The molecular weight may be determined by gel permeation chromatography.

The term "peak melting point ($T_m$)" refers to a melting point determined as a maximum of the curve determined by means of differential scanning calorimetry (DSC) using the measurement method as defined in ISO 11357 standard using a heating rate of 2° C./min. The measurements can be performed with a Mettler Toledo DSC 3+ device and the $T_m$ values can be determined from the measured DSC-curve with the help of the DSC-software. In case the measured DSC-curve shows several peak temperatures, the first peak temperature coming from the lower temperature side in the thermogram is taken as the peak melting temperature ($T_m$).

The term "glass transition temperature" ($T_g$) refers to the temperature above which temperature a polymer component becomes soft and pliable, and below which it becomes hard and glassy. The glass transition temperature ($T_g$) is preferably determined by dynamical mechanical analysis (DMA) as the peak of the measured loss modulus (G") curve using an applied frequency of 1 Hz and a strain level of 0.1%.

The term "crosslinked" refers to a polymer matrix, in which the polymer chains are inter-connected by a plurality of covalent bonds that are stable mechanically and thermally. Other possible forms of crosslinked polymers such as physically crosslinked polymers are not regarded as "crosslinked" in the context of the present disclosure. The terms "cured" and "vulcanized" may be used interchangeably with the term "crosslinked".

The term "crosslinking degree" refers to a proportion of the component, which is insoluble in boiling xylene. The percentage of insoluble proportion can be determined by refluxing a test specimen in boiling xylene, weighting the dried residue and making suitable corrections for other soluble and insoluble components present in the tested composition. Preferably, the crosslinking degree is measured by using a method as defined ISO 10147 standard.

The "amount or content of at least one component X" in a composition, for example "the amount of the at least one polymer P1" refers to the sum of the individual amounts of all polymers P1 contained in the composition. Furthermore, in case the composition comprises 20 wt.-% of at least one polymer P1, the sum of the amounts of all polymers P1 contained in the composition equals 20 wt.-%.

The term "room temperature" designates a temperature of 23° C.

The waterproofing layer is preferably a sheet-like element having first and second major surfaces. The term "sheet-like element" refers in the present document to elements having a length and width at least 25 times, preferably at least 50 times, more preferably at least 150 times greater than the thickness of the element. The term "major surface" refers to the planar surfaces of a sheet-like element defining a thickness of said element there between.

The outer layer of non-woven fabric is directly adhered over at least part of its surface to the second major surface of the waterproofing layer. The expression "directly adhered" is understood to mean in the context of the present invention that no further layer or substance, such as an adhesive layer, is present between the layers, and that the opposing surfaces of the two layers are directly connected, in particular bonded to each other. At the transition area between the two layers, the materials forming the layers can also be present mixed with each other.

According to one or more embodiments, the outer layer of non-woven fabric is directly adhered over at least part of its surface to the second major surface of the waterproofing layer through thermal bonding.

The expression "through thermal bonding" is understood to mean in the context of the present invention that the outer layer of non-woven fabric has been adhered to the second major surface of the waterproofing layer by using thermal bonding means, i.e. by applying thermal energy to at least one of the outer layer of non-woven fabric and the waterproofing layer sufficient to at least partially melt the composition forming the respective layer(s) followed by contacting the opposing surfaces of the layers with each other, preferably under the influence of pressure, and cooling the layers, which results in formation of a thermal bond between the layers without use of an adhesive.

According to one or more embodiments, the outer layer of non-woven fabric has been thermally laminated to at least part of the second major surface of the waterproofing layer in a manner that gives direct bonding between the outer layer of non-woven fabric and the waterproofing layer. The term "thermal lamination" refers in the present document to a process in which the respective layers are bonded to each other by the application of heat and pressure, such that the layers remain adhered to each other when the pressure is removed.

Preferably, at least 85%, more preferably at least 90%, even more preferably at least 92.5%, most preferably at least 95% of the surface of the outer layer of layer of non-woven fabric is directly adhered to the second major surface of the waterproofing layer. It may also be preferred that the outer layer of non-woven fabric is directly adhered over its substantially entire surface to the second major surface of the waterproofing layer. The expression "substantially entire surface" is understood to mean at least 97%, preferably at least 98%, more preferably at least 99% of the respective surface.

Preferably, the outer layer of non-woven fabric covers at least 85%, more preferably at least 90%, even more preferably at least 92.5%, in particular at least 95% of the second major surface of the waterproofing layer. It may also be preferred that the outer layer of non-woven fabric covers substantially entire area of the second major surface of the waterproofing layer, such as at least 97%, preferably at least 98%, more preferably at least 98.5%, even more preferably at least 99% of the second major surface of the waterproofing layer.

The term "non-woven fabric" designates in the present disclosure materials composed of fibers, which are bonded together by using chemical, mechanical, or thermal bonding means, and which are neither woven nor knitted. Non-woven fabrics can be produced, for example, by using a carding or needle punching process, in which the fibers are mechanically entangled to obtain the nonwoven fabric. In chemical bonding, chemical binders such as adhesive materials are used to hold the fibers together in a nonwoven fabric.

The waterproofing layer comprises at least one thermoplastic elastomer P1 and the outer layer of non-woven fabric comprise at least one polymer P2, wherein the at least one thermoplastic elastomer P1 and the at least one polymer P2 are preferably compatible and/or at least partially miscible with each other. By the polymers being "compatible" is understood to mean that the properties of a blend composed of the at least one thermoplastic elastomer P1 and the at least one polymer P2 are not inferior to those of the individual polymers P1 and P2. A blend of compatible polymers is commonly characterized as an immiscible polymer blend that exhibits macroscopically uniform physical properties whereas a blend of miscible polymers is commonly characterized as a homogeneous polymer blend.

According to one or more embodiments, the at least one thermoplastic elastomer P1 and the at least one polymer P2 are at least partially miscible, preferably miscible with each other. By the polymer components being "miscible" is understood to mean that a polymer blend composed of the at least one thermoplastic elastomer P1 and the at least one polymer P2 has a negative Gibbs free energy and heat of mixing. The polymer blends composed of entirely miscible polymer components tend to have one single glass transition point ($T_g$), which can be measured using dynamic mechanical thermal analysis (DMTA). The glass transition point can be determined, for example, as the peak of the measured tan delta curve (ratio of storage and loss moduli).

Apart from the requirement that the at least one thermoplastic elastomer P1 is preferably compatible and/or at least partially miscible with the at least one polymer P2, the composition of the waterproofing layer is not particularly restricted. However, it may be preferable that the composition of the waterproofing layer is selected such that the sealing device as a whole fulfils the general requirements for roofing membranes, in particular the requirements as defined in DIN 20000-201:2015-08 standard.

It may, for example, be preferred that the sealing device shows an impact resistance measured according to EN 12691: 2005 standard in the range of 200-1500 mm and/or a longitudinal and a transversal tensile strength measured at a temperature of 23° C. according to DIN ISO 527-3 standard of at least 5 MPa and/or a longitudinal and transversal elongation at break measured at a temperature of 23° C. according to DIN ISO 527-3 standard of at least 300% and/or a water resistance measured according to EN 1928 B standard of 0.6 bar for 24 hours and/or a maximum tear strength measured according to EN 12310-2 standard of at least 100 N.

According to one or more embodiments, the at least one thermoplastic elastomer P1 has a peak melting point ($T_m$) of at or below 250° C., preferably at or below 200° C., more preferably at or below 185° C., even more preferably at or below 175° C. and/or a glass transition temperature ($T_g$) of below 0° C., preferably below −5° C., more preferably below −10° C.

The amount of the at least one thermoplastic elastomer P1 in the waterproofing layer is not particularly restricted. Preferably, the waterproofing layer comprises, as polymer basis, at least 15 wt.-%, more preferably at least 35 wt.-%, even more preferably at least 45 wt.-%, of the at least one thermoplastic elastomer P1. According to one or more embodiments, the waterproofing layer comprises, as polymer basis, 15-95 wt.-%, preferably 30-90 wt.-%, more preferably 35-85 wt.-%, even more preferably 35-80 wt.-%, still more preferably 35-75 wt.-% of the at least one thermoplastic elastomer P1. The polymer basis of the waterproofing layer may comprise, in addition to the at least one thermoplastic elastomer P1, other polymers or copolymers which are not allocated to the category of thermoplastic elastomers P1.

The amount of the at least one polymer P2 in the outer layer of non-woven material is not particularly restricted. Preferably, the at least one polymer P2 is present in the outer layer of non-woven fabric in an amount of at least 50 wt.-%, more preferably at least 70 wt.-%, even more preferably at least 90 wt.-%, based on the total weight of the outer layer of non-woven fabric. According to one or more embodiments, the at least one polymer P2 is present in the outer layer of non-woven fabric in an amount of 50-97.5 wt.-%, preferably 55-95 wt.-%, more preferably 60-95 wt.-%, even more preferably 65-95 wt.-%, still more preferably 75-95 wt.-%, based on the total weight of the outer layer of non-woven fabric.

According to one or more embodiments, the at least one thermoplastic elastomer P1 is a propylene-based thermoplastic elastomer (TPE), preferably selected from the group consisting of polypropylene-based thermoplastic polyolefins (TPO) and polypropylene copolymers.

Thermoplastic polyolefins (TPOs) a specific type of thermoplastic elastomers, which are based solely on olefinic components. These are also known as "thermoplastic olefins" or "olefinic thermoplastic elastomers" (TPE-O). TPOs are heterophase polyolefin compositions containing a high crystallinity base polyolefin and a low-crystallinity or amorphous polyolefin modifier. The heterophasic phase morphology consists of a matrix phase composed primarily of the base polyolefin and a dispersed phase composed primarily of the polyolefin modifier. Commercially available TPOs include reactor blends of the base polyolefin and the polyolefin modifier, also known as "in-situ TPOs, and physical blends of the components. In case of a reactor-blend, the components are typically produced in a sequential polymerization process, wherein the components of the matrix phase are produced in a first reactor and transferred to a second reactor, where the components of the dispersed phase are produced and incorporated as domains in the matrix phase. A physical blend type TPO is produced by melt-mixing the base polyolefin with the polyolefin modifier each of which was separately formed prior to blending of the components.

The term polypropylene-based TPO" designates in the present document specific type of TPOs containing high crystallinity polypropylene having a peak melting point ($T_m$) of 100° C. or more, preferably homopolymer polypropylene and/or a random copolymer polypropylene (RCP) with a low comonomer content as the base polymer and one or more ethylene copolymer(s) having a glass transition temperature of −20° C. or less, preferably ethylene/propylene-rubber (EPR), as the polyolefin modifier. Reactor-blend type TPOs comprising polypropylene as the base polymer are often referred to as "heterophasic polypropylene copolymers" whereas reactor-blend type TPOs comprising polypropylene random copolymer as the base polymer are often referred to as "heterophasic random polypropylene copolymers".

Depending on the amount of the polyolefin modifier, the commercially available polypropylene-based TPOs are typically characterized as "polypropylene impact copolymers" (ICP) or as "reactor-TPOs" or as "soft-TPOs". The main difference between these types of products is that the amount of the polyolefin modifier is typically significantly lower in ICPs than in reactor-TPOs and soft-TPOs, such as not more than 40 wt.-%, in particular not more than 35 wt.-%. Consequently, typical ICPs tend to have a lower rubber content determined according to ISO 16152 2005 standard as well as higher flexural modulus determined according to ISO 178:2010 standard compared to reactor-TPOs and soft-TPOs.

Suitable polypropylene-based TPOs for use as the at least one thermoplastic elastomer P1 are commercially available, for example, under the trade name of of Hifax®, Adflex® and Adsyl® (all from Lyondell Basell), such as Hifax® CA 10A, Hifax® CA 12A, and Hifax® CA 212 A. Further suitable polypropylene-based TPOs are commercially available under the trade name of Borsoft® (from Borealis Polymers), such as Borsoft® SD233 CF, which is often characterized as "heterophasic random polypropylene copolymer" or as a "crystalline heterophasic ethylene-propylene copolymer".

Suitable polypropylene copolymers belonging to the group of propylene-based thermoplastic elastomers (TPE) include those propylene-α-olefin copolymers and propylene-ethylene copolymers, which are often characterized as propylene-based plastomers (PBPs) and propylene-based elastomers (PBEs).

Particularly suitable polypropylene copolymers for use as the at least one thermoplastic elastomer P1 include low crystallinity random propylene-ethylene copolymers comprising at least 70 wt.-% of propylene and 5-30 wt.-%, preferably 5-20 wt.-% of ethylene and preferably having a DSC-determined crystallinity in the range of 1-30 wt.-%, more preferably 2-20 wt.-% and/or preferably having a xylene cold soluble content determined according to ISO 16152-2005 standard of at least 70 wt.-%, more preferably at least 80 wt.-%, even more preferably at least 90 wt.-% and/or preferably having a softening point determined by Ring and Ball measurement conducted according to DIN EN 1238 standard in the range of 25-105° C., more preferably 25-85° C.

Such low crystallinity random propylene-ethylene copolymers can be made by using a metallocene-type catalyst or by using non-metallocene catalyst compounds. Suitable low crystallinity random propylene-ethylene copolymers are commercially available, for example, under the trade name of Vistamaxx® (form Exxon Mobil), such as Vistamaxx® 3000-, 6100- and 6200-series and under the trade name of Versify® (from Dow Chemical), such as Versify® 2000-, 3000-, and 4000-series.

According to one or more embodiments, the at least one thermoplastic elastomer P1 is selected from the group consisting of polypropylene-based thermoplastic polyolefins (TPO) and low crystallinity random propylene-ethylene copolymers comprising at least 70 wt.-% of propylene and 5-20 wt.-%, preferably 5-16 wt.-% of ethylene.

According to one or more embodiments, the at least one thermoplastic elastomer P1 comprises at least one polypropylene-based TPO, preferably having a flexural modulus determined according to ISO 178:2010 standard of not more than 1000 MPa, more preferably not more than 750 MPa, even more preferably not more than 600 MPa, still more preferably not more than 500 MPa, such as not more than 400 MPa. The expression "the at least one thermoplastic elastomer P1 comprises at least one polypropylene-based TPO" is understood to mean that the waterproofing layer comprises one or more polypropylene-based TPOs as representatives of the at least one thermoplastic elastomer P1. According to one or more further embodiments, the at least one thermoplastic elastomer P1 comprises at least one polypropylene-based TPO, preferably having a flexural modulus determined according to ISO 178:2010 standard of not more than 1000 MPa, more preferably not more than 750 MPa, even more preferably not more than 600 MPa, still more preferably not more than 500 MPa, such as not more than 400 MPa and/or at least one low crystallinity random propylene-ethylene copolymer comprising at least 70 wt.-% of propylene and 5-20 wt.-%, preferably 5-16 wt.-% of ethylene, preferably having a xylene cold soluble content determined according to ISO 16152-2005 standard of at least 70 wt.-%, more preferably at least 80 wt.-%, even more preferably at least 90 wt.-%.

According to one or more embodiments, the at least one polymer P2 is a thermoplastic olefin-based polymer. The term "olefin-based polymer" refers in the present document to polymers derived from one or more olefin monomers.

According to one or more embodiments, the at least one polymer P2 is selected from the group consisting of polypropylene and polypropylene copolymers. The term "polypropylene" designates in the present document isotactic polypropylene (iPP), syndiotactic polypropylene (sPP), and homopolymer polypropylene (hPP). The term polypropylene copolymer" refers in the present document to a copolymer formed from propylene and ethylene and/or one or more $C_4$-$C_{20}$ α-olefin monomers wherein the propylene units are present in a major amount and the ethylene and/or α-olefin units are present in a minor amount, i.e. in an amount of less than 50 wt.-%, based on the weight of the copolymer.

Suitable polypropylenes to be used as the at least one polymer P2 have a peak melting temperature ($T_m$) determined by using the method as defined in ISO 11357-3 standard in the range of 90-190° C., preferably 100-170° C., more preferably 120-160° C. and/or a melt flow index (MFI) (230° C./2.16 kg) determined by using the method as defined in ISO 1133 standard in the range of 0.5-60 g/10 min, preferably 1.0-35 g/10 min, more preferably 1.0-20 g/10 min.

Suitable polypropylene copolymers to be used as the at least one polymer P2 include, for example, propylene-α-olefin and propylene-ethylene random and block copolymers. Suitable comonomers for the propylene-α-olefin copolymers include, for example, one or more $C_4$-$C_{20}$ α-olefin monomers, in particular one or more of 1-butene, 1-pentene, 1-hexene, 1-heptene, 1-octene, 1-decene, 1-dodecene, and 1-hexadodecene.

Suitable polypropylene copolymers to be used as the at least one polymer P2 have a softening point determined by Ring and Ball measurement conducted according to DIN EN 1238 standard in the range of 50-180° C., preferably 60 170° C., more preferably 70-160° C. and/or a melt flow index (MFI) (230° C./2.16 kg) determined by using the method as defined in ISO 1133 standard in the range of 1.0-50 g/10 min, preferably 1.0-35 g/10 min, more preferably 1.0-20 g/10 min.

According to one or more embodiments, the at least one polymer P2 is a polypropylene, preferably a homopolymer polypropylene. Suitable homopolymer polypropylenes are commercially available, for example, under the trade names of Hostalen® and Moplen® (both from Lyondell Basell).

The thickness of the outer layer of non-woven fabric is not particularly restricted in the present invention. Preferably, the outer layer of non-woven fabric has a mass per unit area (weight) of not more than 300 g/m$^2$, more preferably not more than 200 g/m$^2$, even more preferably not more than 150 g/m$^2$, most preferably not more than 100 g/m$^2$. The mass per unit area of a layer of non-woven fabric can be determined by measuring the mass of test piece of the layer of the non-woven fabric having a given area and dividing the measured mass by the area of the test piece. Preferably, the mass per unit area of the outer layer of non-woven fabric is determined as defined in ISO 9073-18:2007 standard. According to one or more embodiments, the outer layer of non-woven fabric has a mass per unit area (weight) of 15-200 g/m$^2$, preferably 25-150 g/m$^2$, more preferably 25-125 g/m$^2$, even more preferably 25-100 g/m$^2$, most preferably 30-70 g/m$^2$. According to one or more preferred embodiments, the outer layer of non-woven fabric has a mass per unit area (weight) of 5-125 g/m$^2$, preferably 10-100 g/m$^2$, more preferably 10-75 g/m$^2$, even more preferably 15-55 g/m$^2$, still more preferably 15-45 g/m$^2$. Sealing devices comprising such an outer layer of non-woven fabric have been found out to be heat-weldable and also to exhibit decreased amount of blocking.

The sealing device may be a single- or a multi-ply membrane. The term "single-ply membrane" designates in the present document membranes comprising one single waterproofing layer and the term "multi-ply roofing membrane refers to membranes comprising more than one waterproofing layers having similar or different compositions. Single- and multi-ply membranes are known to a person skilled in the art and they may be produced by any conventional means, such as by way of extrusion or co-extrusion, calendaring, or by spread coating. Irrespective of the number of waterproofing layers, it is preferred that the outer layer of non-woven fabric forms one of the outermost layers of the sealing device.

According to one or more embodiments, the sealing device is a single-ply membrane comprising exactly one waterproofing layer. In these embodiments, it may be preferred that the sealing device further comprises a reinforcement layer, which is fully embedded into the waterproofing layer. By the expression "fully embedded" is meant that the reinforcement layer is fully covered by the matrix of the waterproofing layer. The reinforcement layer may be used to ensure the mechanical stability of the waterproofing layer when the sealing device is exposed to varying environmental conditions, in particular to large temperature fluctuations.

The type of the reinforcement layer, if used, is not particularly restricted. For example, the reinforcement layers commonly used for improving the dimensional stability of thermoplastic roofing membranes can be used. Preferable reinforcement layers include non-woven fabrics, woven fabrics, and non-woven scrims, and combinations thereof. According to one or more embodiments, the reinforcement layer comprises a non-woven fabric comprising inorganic and/or synthetic organic fibers and/or a non-woven scrim.

According to one or more embodiments, the reinforcement layer comprises a non-woven fabric comprising or essentially consisting of synthetic organic and/or inorganic fibers. Suitable synthetic organic fibers for the non-woven fabric include, for example, polyester fibers, polypropylene fibers, polyethylene fibers, nylon fibers, and polyamide fibers. Suitable inorganic fibers for the non-woven fabric include, for example, glass fibers, aramid fibers, wollastonite fibers, and carbon fibers.

According to one or more embodiments, the reinforcement layer comprises a non-woven fabric composed of inorganic fibers, preferably selected from the group consisting of glass fibers, aramid fibers, wollastonite fibers, and carbon fibers, more preferably glass fibers. According to one or more further embodiments, the reinforcement layer comprises a non-woven fabric composed of synthetic organic fibers, preferably selected from the group consisting of polyester fibers, polypropylene fibers, polyethylene fibers, nylon fibers, and polyamide fibers.

According to one or more embodiments, the reinforcement layer comprises a non-woven scrim. The term "non-woven scrim" designates in the present document web-like non-woven products composed of at least two sets of parallel yarns (also designated as weft and warp yarns), which lay on top of each other and are chemically bonded to each other. The yarns of a non-woven scrim are typically arranged with an angle of 60-120°, such as 90±5°, towards each other thereby forming interstices, wherein the interstices occupy more than 60% of the entire surface of the non-woven scrim. Typical materials for non-woven scrims include metals, fiberglass, and plastics, in particular polyester, polypropylene, polyethylene, and polyethylene terephthalate (PET).

According to one or more embodiments, the reinforcement layer comprises a non-woven fabric composed of inorganic fibers, preferably selected from the group consisting of glass fibers, aramid fibers, wollastonite fibers, and carbon fibers, more preferably glass fibers and a non-woven scrim composed of glass fiber yarns.

According to one or more embodiments, the sealing device is a multi-ply membrane comprising, in addition to the waterproofing layer, a top layer having a first and a second major surface and located on the upward facing side of the waterproofing layer opposite the side of the outer layer of non-woven fabric. In these embodiments, the second major surface of the top layer is preferably directly or indirectly adhered to at least portion of the first major surface of the waterproofing layer. The waterproofing layer and the top layer can be indirectly adhered to each other, for example, via a connecting layer, such as a layer of adhesive or via a fiber-based reinforcement layer, or a combination thereof. In case a porous connecting layer, such as an open weave fabric, the top layer may be partially directly adhered and partially indirectly adhered to the waterproofing layer.

In case of a multi-ply membrane, it may be preferred that the sealing device further comprises a reinforcement layer, which is located between the top layer and the waterproofing layer. It may also be preferable that the reinforcement layer is partially embedded into the top layer and/or into the waterproofing layer. The expression "partially embedded" is understood to mean, in case of a fiber based reinforcement layer, that portion of the fibers of the reinforcement layer are embedded into the top layer, i.e. covered by the matrix of the top layer whereas other the portion of the fibers is not embedded into the top layer. Suitable types of reinforcement layers have already been described above related to the embodiment of the sealing device with a single-ply membrane.

The composition of the top layer is not particularly restricted. According to one or more embodiments, the top layer comprises at least one thermoplastic polymer P3, preferably selected from the group consisting of ethylene-vinyl acetate copolymer (EVA), ethylene-acrylic ester copolymers, ethylene-α-olefin copolymers, ethylene-propylene copolymers, propylene-α-olefin copolymers, propylene-ethylene copolymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (FIB).

According to one or more embodiments, the at least one thermoplastic polymer P3 is selected from the group consisting of low-density polyethylene, linear low-density polyethylene, high-density polyethylene, ethylene-vinyl acetate copolymer (EVA), ethylene-acrylic ester copolymers, ethylene-α-olefin copolymers, ethylene-propylene copolymers, propylene-α-olefin copolymers, propylene-ethylene copolymers, and polypropylene (PP).

According to one or more further embodiments, the waterproofing layer and the top layer have substantially identical polymer basis. According to one or more further embodiments, the waterproofing layer and the top layer have substantially identical compositions.

The waterproofing layer and the top layer can comprise, in addition to the at least one thermoplastic elastomer P1 and the at least one thermoplastic polymer P3, auxiliary components, for example, UV- and heat stabilizers, antioxidants, plasticizers, flame retardants, fillers, dyes, pigments such as titanium dioxide and carbon black, matting agents, antistatic agents, impact modifiers, biocides, and processing aids such as lubricants, slip agents, antiblock agents, and denest aids. The total amount of these auxiliary components is preferably not more than 50 wt.-%, more preferably not more than 40 wt.-%, most preferably not more than 35 wt.-%, based on the total weight of the waterproofing layer and the top layer, respectively.

It can be advantageous that the sealing device further comprises a top-coating covering at least portion of the first major surface of the top layer. The top-coating may comprise UV-absorbers and/or thermal stabilizers to protect the top layer from damaging influence of sunlight. The top-coating may also comprise color pigments in order to provide the top layer with a desired color.

The thickness of the waterproofing layer and the top layer is not particularly restricted. According to one or more embodiments, the waterproofing layer and the top layer have a thickness determined by using the measurement method as defined in DIN EN 1849-2 standard of 0.1-5.0 mm, preferably 0.4-3.0 mm, more preferably 0.45-2.5 mm, even more preferably 0.5-2.0 mm.

According to one or more embodiments, the waterproofing layer is composed of composition comprising:
a) A thermoplastic elastomer component P and
b) At least one elastomer E,
wherein the thermoplastic elastomer component P comprises the at least one thermoplastic elastomer P1.

The ratio of the amounts of the thermoplastic elastomer component P and the at least one elastomer E depends on the intended application of the sealing device. Increasing the proportion of the at least one elastomer in the polymer basis of the composition improves the flexibility of waterproofing layer. This may be advantageous in some applications, for example, in waterproofing of roof structures.

According to one or more embodiments, the composition of the waterproofing layer comprises, as polymer basis:
a) 25-85 wt.-%, preferably 35-80 wt.-%, more preferably 45-75 wt.-% of the thermoplastic elastomer component P and
b) 5-60 wt.-%, preferably 10-55 wt.-%, more preferably 15-45 wt.-% of the at least one elastomer E.

The polymer basis of the composition of the waterproofing layer may comprise, in addition to the thermoplastic elastomer component P and the at least one elastomer E, other polymers or copolymers which are not allocated to any of these categories. According to one or more embodiments, the polymer basis of the composition of the waterproofing layer consists of the thermoplastic elastomer component P and of the at least one elastomer E.

According to one or more embodiments, the thermoplastic elastomer component P comprises 25-85 wt.-%, preferably 35-80 wt.-%, more preferably 45-75 wt.-% of the total weight of the composition of the waterproofing layer and/or the at least one elastomer E comprises 5-60 wt.-%, preferably 10-55 wt.-%, more preferably 15-45 wt.-% of the total weight of the composition of the waterproofing layer.

According to one or more embodiments, the at least one thermoplastic elastomer P1 comprises at least one polypropylene-based TPO, preferably having a flexural modulus determined according to ISO 178:2010 standard of not more than 1000 MPa, preferably not more than 750 MPa, more preferably not more than 600 MPa, even more preferably not more than 500 MPa and and/or at least one low crystallinity random propylene-ethylene copolymer comprising at least 70 wt.-%, preferably at least 80 wt.-% of propylene and 5-20 wt.-%, preferably 5-16 wt.-% of ethylene, preferably having a xylene cold soluble content determined according to ISO 16152-2005 standard of at least 70 wt.-%, more preferably at least 85 wt.-%, even more preferably at least 90 wt.-%. The expression "the at least one thermoplastic elastomer P1 comprises at least one polypropylene-based TPO and/or at least one low-crystallinity random propylene-ethylene copolymer" is understood to mean that the thermoplastic elastomer component P comprises one or more polypropylene-based TPOs and/or one or more low-crystallinity random propylene-ethylene copolymers as representatives of the at least one thermoplastic elastomer P1.

According to one or more preferred embodiments, the at least one polypropylene-based TPO is selected from the group consisting of heterophasic polypropylene copolymers and heterophasic random polypropylene copolymers.

According to one or more embodiments, the weight ratio of the amount of the at least one polypropylene-based TPO to the amount of the at least one low crystallinity random propylene-ethylene copolymer comprising at least 70 wt.-%, preferably at least 80 wt.-% of propylene and 5-20 wt.-%, preferably 5-16 wt.-% of ethylene, preferably having a xylene cold soluble content determined according to ISO 16152-2005 standard of at least 70 wt.-%, more preferably at least 85 wt.-%, even more preferably at least 90 wt.-%, is in the range of 0.1-1.5, preferably 0.2-1.0, even more preferably 0.3-0.75.

According to one or more embodiments, the at least one thermoplastic elastomer P1 is composed of the at least one at least one polypropylene-based TPO, preferably having a flexural modulus determined according to ISO 178:2010 standard of not more than 1000 MPa, preferably nor more than 750 MPa, more preferably not more than 600 MPa, even more preferably not more than 500 MPa and the at least one low crystallinity random propylene-ethylene copolymer comprising at least 70 wt.-% of propylene and 5-20 wt.-%, preferably 5-16 wt.-% of ethylene, preferably having a xylene cold soluble content determined according to ISO 16152-2005 standard of at least 70 wt.-%, more preferably at least 85 wt.-%, even more preferably at least 90 wt.-%.

According to one or more further embodiments, the thermoplastic elastomer component P further comprises at least one ethylene-based thermoplastic elastomer.

Suitable ethylene-based thermoplastic elastomers include, in particular, ethylene-α-olefin copolymers, which are also known as polyolefin plastomers (POP), polyolefin elastomers (POE), and olefin block copolymers (OBC).

Suitable polyolefin plastomers (POP) based on ethylene-α-olefin copolymers to be used as the at least one ethylene-based thermoplastic elastomer are commercially available, for example, under the trade name of Affinity® (from Dow Chemicals), such as such as Affinity® EG 8100G, Affinity® EG 8200G, Affinity® SL 8110G, Affinity® KC 8852G, Affinity® VP 8770G, and Affinity® PF 1140G, and under the trade name of Exact® (from Exxon Mobil), such as Exact® 3024, Exact® 3027, Exact® 3128, Exact® 3131, Exact® 4049, Exact® 4053, Exact® 5371, and Exact® 8203.

Suitable polyolefin elastomers (POE) based on ethylene-α-olefin random copolymers to be used as the at least one ethylene-based thermoplastic elastomer are commercially available, for example, under the trade name of Engage® (from Dow Chemicals), such as Engage® 7256, Engage® 7467, Engage® 7447, Engage® 8003, Engage® 8100, Engage® 8480, Engage® 8540, Engage® 8440, Engage® 8450, Engage® 8452, Engage® 8200, and Engage® 8414.

Suitable olefin block copolymers (OBC) based on ethylene-α-olefin block copolymers to be used as the at least one ethylene-based thermoplastic elastomer are commercially available, for example, under the trade name of Infuse® (from Dow Chemicals), Infuse® 9100, Infuse® 9107, Infuse® 9500, Infuse® 9507, and Infuse® 9530.

According to one or more embodiments, the at least one thermoplastic elastomer P1 and the at least one elastomer E are present in the composition as co-continuous phases. The expression "co-continuous" is understood to mean that the distinction between disperse and continuous polymer phases in the composition becomes difficult, as each phase becomes continuous in space. There may also be regions where the first phase appears to be dispersed within the second, and vice versa. Furthermore, each polymer is in the form of a continuous structure, wherein the structures of each polymer are intertwined with one another to form a co-continuous macrostructure.

Preferably, the at least one thermoplastic elastomer P1 and the at least one elastomer E are compatible. By the polymers components being "compatible" is understood to mean that the properties of a blend composed of the at least one thermoplastic elastomer and the at least one elastomer are not inferior to those of the individual polymer components. It may also be preferable that the at least one thermoplastic elastomer and the at least one elastomer are partially miscible but not necessarily entirely miscible with each other. By the polymer components being "miscible" is understood to mean that a polymer blend composed of the at least one thermoplastic elastomer and the at least one elastomer has a negative Gibbs free energy and heat of mixing. The polymer blends composed of entirely miscible polymer components tend to have one single glass transition point, which can be measured using dynamic mechanical thermal analysis (DMTA). The glass transition point can be determined, for example, as the peak of the measured tan delta curve (ratio of storage and loss moduli).

It may be preferable that the at least one elastomer E contained in the composition of the waterproofing layer has a crosslinking degree, measured by using the method as defined in ISO 10147 standard, of not more than 10.0 wt.-%, more preferably not more than 5.0 wt.-%, even more preferably not more than 2.5 wt.-%, most preferably not more than 1.5 wt.-%. It may also be preferable that the at least one elastomer is a non-crosslinked elastomer.

The at least one elastomer E is preferably selected from the group consisting of butyl rubber, halogenated butyl rubber, ethylene-propylene diene rubber (EPDM), natural rubber, chloroprene rubber, synthetic 1,4-cis-polyisoprene, polybutadiene, ethylene-propylene rubber, styrene-butadiene copolymer, isoprene-butadiene copolymer, styrene-isoprene-butadiene rubber, methyl methacrylate-butadiene copolymer, methyl methacrylate-isoprene copolymer, acrylonitrile-isoprene copolymer, and acrylonitrile-butadiene copolymer.

Preferred elastomers E include isobutylene-based homopolymers and copolymers. These polymers can be described as random copolymer of a $C_4$ to $C_7$ isomonoolefin derived unit, such as isobutylene derived unit, and at least one other polymerizable unit.

It may be preferable that the at least one elastomer E has a low degree of unsaturation. The term "degree of unsaturation" refers in the present document to the ratio of the number of unsaturated carbon-to-carbon bonds to the number of atoms in the linear chain of the average theoretical linear elastomer molecule. The low degree of unsaturation is preferred, for example, in roofing applications, in which the sealing devices have to be able to withstand permanent exposure to various environmental factors, in particular UV-radiation. Preferably, the at least one elastomer E has a mole percent unsaturation of not more than 5.0, more preferably not more than 2.5, even more preferably not more than 1.5, most preferably not more than 0.5.

The at least one elastomer E is preferably selected from the group consisting of butyl rubber and halogenated butyl rubber, preferably halogenated butyl rubber. The term "halogenated rubber" refers in the present documents to a rubber having a halogen content of at least 0.1 mol.-percent, wherein the halogen is preferably selected from the group consisting of bromine, chlorine and iodine. Preferred halogenated butyl rubbers have a halogen content of not more than 10 wt.-%, more preferably not more than 7.5 wt.-%, most preferably not more than 5.0 wt.-%, based on the total weight of the butyl rubber.

The term "butyl rubber" designates in the present document a polymer derived from a monomer mixture containing a major portion of a $C_4$ to $C_7$ monoolefin monomer, preferably an isoolefin monomer and a minor portion, such as not more than 30 wt.-%, of a $C_4$ to $C_{14}$ multiolefin monomer, preferably a conjugated diolefin.

The preferred $C_4$ to $C_7$ monoolefin monomer may be selected from the group consisting of isobutylene, 2-methyl-1-butene, 3-methyl-1-butene, 2-methyl-2-butene, 4-methyl-1-pentene, and mixtures thereof.

The preferred $C_4$ to $C_{14}$ multiolefin comprises a $C_4$ to $C_{10}$ conjugated diolefin. The preferred $C_4$ to $C_{10}$ conjugated diolefin may be selected from the group comprising isoprene, butadiene, 2,4-dimethylbutadiene, piperyline, 3-methyl-1,3-pentadiene, 2,4-hexadiene, 2-neopentyl-1,3-butadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof.

Preferred butyl rubbers are derived from a monomer mixture containing from about 80 wt.-% to about 99 wt.-% of a $C_4$ to $C_7$ monoolefin monomer and from about 1.0 wt.-% to about 20 wt.-% of a $C_4$ to $C_{14}$ multiolefin monomer. More preferably, the monomer mixture contains from about 85 wt.-% to about 99 wt.-% of a $C_4$ to $C_7$ monoolefin monomer and from about 1.0 wt.-% to about 10 wt.-% of a $C_4$ to $C_{14}$ multiolefin monomer. Most preferably, the monomer mixture contains from about 95 wt.-% to about 99 wt.-% of a $C_4$ to $C_7$ monoolefin monomer and from about 1.0 wt.-% to about 5.0 wt.-% of a $C_4$ to $C_{14}$ multiolefin monomer.

The most preferred butyl rubbers are derived from a monomer mixture comprising from about 97 wt.-% to about 99.5 wt.-% of isobutylene and from about 0.5 wt.-% to about 3 wt.-% of isoprene.

According to one or more embodiment, the at least one elastomer E is a halogenated butyl rubber, preferably a bromobutyl rubber or a chlorobutyl rubber, having a halogen content in the range of 0.1-10 wt.-%, more preferably 0.5-8 wt.-%, most preferably 0.5-5.0 wt.-%, based on the total weight of the butyl rubber. According to one or more further embodiments, the at least one elastomer E is a halogenated butyl rubber, preferably a bromobutyl rubber or a chlorobutyl rubber, preferably having a halogen content in the range of 0.1-5.0 wt.-%, preferably 0.1-3.5 wt.-%, more preferably 0.1-2.5 wt.-%, most preferably 0.1-1.5 wt.-%.

It may be preferable that the waterproofing layer has an elastic modulus, measured by using the method as defined in ISO 527-2 standard at a temperature of 23° C., of not more than 50 N/mm$^2$, more preferably not more than 25 N/mm$^2$, even more preferably not more than 15 N/mm$^2$.

According to one or more embodiments, the composition of the waterproofing layer comprises, in addition to the thermoplastic elastomer component P and the at least one elastomer E, at least one flame retardant. These may be needed, in particular, in case the sealing device is used in roofing applications, for example, as a roofing membrane.

According to one or more embodiments, the at least one flame retardant is present in the composition of the waterproofing layer in an amount of 1-50 wt.-%, preferably 5-40 wt.-%, more preferably 10-40 wt.-%, based on the total weight of the composition. The at least one flame retardant is preferably selected from the group consisting of magnesium hydroxide, aluminum trihydroxide, antimony trioxide, ammonium polyphosphate, and melamine-, melamine resin-, melamine derivative-, melamine-formaldehyde-, silane-, siloxane-, and polystyrene-coated ammonium polyphosphates.

Other suitable flame retardants include, for example, 1,3,5-triazine compounds, such as melamine, melam, melem, melon, ammeline, ammelide, 2-ureidomelamine, acetoguanamine, benzoguanamine, diaminophenyltriazine, melamine salts and adducts, melamine cyanurate, melamine borate, melamine orthophosphate, melamine pyrophosphate, dimelamine pyrophosphate and melamine polyphosphate, oligomeric and polymeric 1,3,5-triazine compounds and polyphosphates of 1,3,5-triazine compounds, guanine, piperazine phosphate, piperazine polyphosphate, ethylene diamine phosphate, pentaerythritol, borophosphate, 1,3,5-trihydroxyethylisocyanaurate, 1,3,5-triglycidylisocyanaurate, triallylisocyanurate and derivatives of the aforementioned compounds.

Suitable flame retardants are commercially available, for example, under the trade name of Martinal® and Magnifin® (both from Albemarle) and under the trade names of Exolit® (from Clariant), Phos-Check® (from Phos-Check) and FR CROS® (from Budenheim).

The composition of the waterproofing layer may further comprise at least one hindered amine light stabilizer (HALS). These compounds are typically added to polymer blends as stabilizers against light-induced polymer degradation. Such stabilizers are needed, in particular, in case the sealing device is used in outdoor applications, for example, for waterproofing of roof structures.

According to one or more embodiments, the composition of the waterproofing layer comprises 0.1-10.0% by weight, preferably 0.1-5.0% by weight, based on the total weight of the composition, of at least one hindered amine light stabilizer (HALS).

Suitable commercially available hindered amine light stabilizers include, in particular, alkoxyamine hindered amine light stabilizers (NOR-HALS), such as:

bis-(1-octyloxy-2,2,6,6-tetramethyl-4-piperidinyl) sebacate, commercially available, for example, as Tinuvin® NOR 123 (from Ciba Chemicals, CAS number 129757-67-1); derivatives of N-butyl-2,2,6,6-tetramethyl-4-piperidinamine, commercially available, for example, as Tinuvin® NOR 152 (from Ciba Chemicals); reaction products with 3-bromo-1-propene, n-butyl-1-butanamine and N-butyl-2,2,6,6-tetramethyl-4-piperidinamine, oxidised, hydrogenated, commercially available, for example, as Tinuvin NOR® 371 (from Ciba Chemicals); reaction products of N,N'-ethane-1,2-diylbis(1,3-propanediamine), cyclohexane, peroxidized 4-butylamino-2,2,6,6-tetramethylpiperidine and 2,4,6-trichloro-1,3,5-triazine, commercially available as Flamestab NOR 116 (from BASF); and Hostavin NOW ex (from Clariant).

The composition of the waterproofing layer may further comprise at least one UV-absorber selected the group consisting of hydroxybenzophenones, hydroxybenzotriazoles, triazines, anilides, benzoates, cyanoacrylates, phenylformamidines, and mixtures thereof. According to one or more embodiments, the composition of the waterproofing layer comprises 0.1-10.0% by weight, preferably 0.5-5.0% by weight, based on the total weight of the composition, of at least one UV-absorber.

Suitable UV-absorbers are commercially available, for example, under the trade name of Tinuvin® (from Ciba Specialty Chemicals), such as Tinuvin® 213, 234, 320, 326-329, 350, 360, 571.

The composition of the waterproofing layer may further comprise auxiliary components such as thermal stabilizers, antioxidants, plasticizers, fillers, dyes, pigments such as titanium dioxide and carbon black, matting agents, antistatic agents, impact modifiers, biocides, and processing aids such as lubricants, slip agents, antiblock agents, and denest aids.

Suitable fillers include, for example, inert mineral fillers, such as sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

The total amount of these auxiliary components is preferably not more than 25 wt.-%, more preferably not more than 15 wt.-%, most preferably not more than 10 wt.-%, based on the total weight of the composition of the waterproofing layer.

The composition of the waterproofing layer as defined above may be obtained by melt-processing a starting blend comprising the thermoplastic elastomer component P and the at least one elastomer E. The term "melt processing" refers in the present disclosure to a process, in which at least one molten polymeric component is intimately mixed with at least one other component, which may be another molten polymeric component or a solid component, such as a filler or a catalyst. The melt-processed starting blend may be used as such or further processed to a shaped article by using any conventional technique known to a skilled person, for example, extrusion, molding, or calendaring technique. Preferably, the composition of the waterproofing layer is obtained by melt-processing a starting blend comprising the thermoplastic elastomer component P and the at least one elastomer E and extruding the melt-processed starting blend through an extruder die.

The melt-processing is preferably conducted at a temperature, which is above the melting point of the thermoplastic elastomer component P. In case the starting blend comprises more than one thermoplastic elastomer, the melt-processing is preferably conducted at a temperature, which is above the melting point of the at least one thermoplastic elastomer P1 having the highest melting point. The melt processing can be conducted as a batch process using any conventional mixer, such as a Brabender, Banbury, or roll mixer or as continuous process using a continuous type mixer, preferably an extrusion apparatus comprising an extruder, preferably a single screw or a twin screw extruder.

It may be preferable that the starting blend comprises, in addition to the thermoplastic elastomer component P and the at least one elastomer E, at least one catalyst. The at least one catalyst may be present in the starting blend to catalyze chain extension and/or crosslinking and/or coupling reactions of the polymer components, in particular of the at least one elastomer E, during and/or after the melt-processing step.

The at least one catalyst, if used, is preferably selected from the group consisting of metal oxides, metal salts of fatty acids and metal salts of boric acid, sulfur catalysts, phenol resin catalysts, fatty acids, and mixtures thereof.

Suitable metal oxide catalysts and metal salts of fatty acids include, for example, ZnO, CaO, MgO, $Al_2O_3$, $CrO_3$, FeO, $Fe_2O_3$, and NiO and zinc salts of fatty acids having at least 6 carbon atoms. Suitable sulfur catalysts include powdered sulfur, precipitated sulfur, high dispersion sulfur, surface-treated sulfur, insoluble sulfur, dimorpholinedisulfide, alkylphenoldisulfide, and mixtures thereof. Suitable phenol resin catalysts include bromide of an alkylphenol resin or mixed catalysts containing stannous chloride, chloroprene, or another halogen donor and an alkylphenol resin, and mixtures thereof.

According to one or more embodiments, the at least one catalyst is selected from the group consisting of ZnO, CaO, MgO, $Al_2O_3$, $CrO_3$, FeO, $Fe_2O_3$, and NiO, zinc salts of fatty acids having at least 6 carbon atoms, preferably at least 13 carbon atoms, zinc borate, and mixtures thereof.

The at least one catalyst may also be used in combination with at least one accelerator selected from the group consisting of guanidine compounds, aldehyde amine compounds, aldehyde ammonium compounds, thiazole compounds, sulfonamide compounds, thiourea compounds, thiuram compounds, xanthane compounds, and dithiocarbamate compounds. Such accelerators may be present in the starting blend in a total amount of 0.1-5.0 phr (parts by weight per 100 parts by weight of the at least one elastomer E).

The at least one catalyst, if used, is preferably present in the starting blend in an amount of not more than 10 wt.-%, more preferably not more than 7.5 wt.-%, most preferably not more than 5.0 wt.-%, based on the total weight of the starting blend. It may be preferable that the at least one catalyst is present in the starting blend in an amount of 0.1-7.5% wt.-%, more preferably 0.1-5.0 wt.-%, even more preferably 0.1-2.5 wt.-%, most preferably 0.25-2.0 wt.-%, based on the total weight of the starting blend. It is also possible that some portion of the at least one catalyst is not consumed in the reactions of the polymer components during the melt-processing and shaping steps. It may, therefore, be advantageous that the at least catalyst is also present in the composition of the waterproofing layer. The amount of the at least one catalyst in the composition of the waterproofing layer is preferably significantly lower than in the starting blend. It may be preferable that the composition of the waterproofing layer comprises not more than 1.5 wt.-%, more preferably not more than 1.0 wt.-%, most preferably not more than 0.5 wt.-% based on the total weight of the composition, of the at least one catalyst.

According to one or more embodiments, the at least one catalyst is ZnO and the starting blend further comprises at least 0.05 wt.-%, preferably 0.1-0.5 wt.-%, based on the total weight of the starting blend, of at least one zinc salt of a fatty acid, preferably zinc stearate and/or at least 0.05 wt.-%, preferably 0.1-0.5 wt.-%, based on the total weight of the starting blend, at least one saturated fatty acid having at least 6 carbon atoms, preferably at least 13 carbon atoms.

According to one or more embodiments, the at least one catalyst is ZnO and the starting blend further comprises at least 0.05 wt.-%, preferably 0.1-0.5 wt.-%, based on the total weight of the starting blend, of zinc stearate and/or at least 0.05 wt.-%, preferably 0.1-0.5 wt.-%, based on the total weight of the starting blend, of a fatty acid selected from the group consisting of stearic acid and montanic acid.

The preferences given above for the waterproofing layer, the outer layer of non-woven fabric, the top layer, and the reinforcement layer apply equally to all aspects of the present invention unless otherwise stated.

Another subject of the present invention is a method for producing a sealing device according to the present invention, the method comprising steps of:

I) Providing a waterproofing layer having a first and a second major surface and II) Adhering the outer layer of non-woven fabric to the second major surface of the waterproofing layer by using thermal bonding means.

According to one or more embodiments, step II) of the method comprises thermally laminating the outer layer of non-woven fabric to at least part of the second major surface of the waterproofing layer in a manner that gives direct bonding between the outer layer of non-woven fabric and the waterproofing layer. The thermal lamination of the outer layer of non-woven fabric to waterproofing layer can be conducted by using any conventional means, such as heated calendaring rolls and/or lamination wheels or hot-pressing means.

The further details of the method for producing the sealing device depend on the embodiment of the sealing device, in particular if the sealing device is a single-ply or a multi-ply membrane.

According to one or more embodiments, the sealing device is a single-ply membrane comprising one single waterproofing layer having a first and a second major surface, wherein the step I) comprises:

I') Extruding a composition of the waterproofing layer or a starting blend comprising the thermoplastic elastomer component P and the at least one elastomer E through an extruder die, II') Optionally employing spaced apart calender cooling rolls through which the waterproofing layer obtained in step I') is drawn.

In the extrusion step, the composition of the waterproofing layer or the starting blend is first melt-processed in an extruder to produce a homogenized melt, which is then extruded through the extruder die. Suitable extrusion apparatuses comprising at least one extruder and an extruder die are well known to a person skilled in the art. Any conventional extruders, for example, a ram extruder, single screw extruder, or a twin-screw extruder may be used. Preferably, the extruder is a screw extruder, more preferably a twin-screw extruder.

According to one or more embodiments, the sealing device is a multi-ply membrane comprising a waterproofing layer having a first and a second major surface, a top layer having a first and a second major surface, and a reinforcement layer located between the waterproofing layer and the top layer, wherein the step I) comprises:

I') Extruding a composition of the waterproofing layer or a starting blend comprising the thermoplastic elastomer component P and the at least one elastomer E through an extruder die onto a first surface of the reinforcement layer, II') Extruding a composition of the top layer through an extruder die onto a second surface of the reinforcement layer to form a reinforced multi-ply membrane, II') Optionally employing spaced apart calender cooling rolls through which the reinforced multi-ply membrane obtained in step II') is drawn.

Another subject of the present invention is a use of a layer of non-woven fabric comprising or essentially consisting of polypropylene fibers for reducing blocking of a polymeric layer having a first and a second major surface and comprising at least one propylene-based thermoplastic elastomer, wherein the layer of non-woven fabric is directly adhered over at least part of its surface to one of the major surfaces of the polymeric layer.

According to one or more embodiments, the layer of non-woven fabric has been thermally laminated to at least part of the second major surface of the polymeric layer in a manner that gives direct bonding between the outer layer of non-woven fabric and the polymeric layer.

Preferably, the layer of non-woven fabric has a mass per unit area (weight) of not more than 300 g/m², more preferably not more than 200 g/m², even more preferably not more than 150 g/m², most preferably not more than 100 g/m². According to one or more embodiments, the layer of non-woven fabric has a mass per unit area (weight) of 15-200 g/m², preferably 25-150 g/m², more preferably 25-125 g/m², even more preferably 25-100 g/m², most preferably 30-70 g/m². According to one or more preferred embodiments, the outer layer of non-woven fabric has a mass per unit area (weight) of 5-125 g/m², preferably 10-100 g/m², more preferably 10-75 g/m², even more preferably 15-55 g/m², still more preferably 15-45 g/m².

According to one or more embodiments, the at least one propylene-based thermoplastic elastomer is selected from the group consisting of polypropylene-based thermoplastic polyolefins (TPO) and polypropylene copolymers.

According to one or more embodiments, the polymeric layer comprises, in addition to the at least one propylene-based thermoplastic elastomer, at least one elastomer.

According to one or more embodiments, the polymeric layer comprises, as polymer basis, 25-85 wt.-%, preferably 35-80 wt.-%, more preferably 45-75 wt.-% of the at least one propylene-based thermoplastic elastomer and 5-60 wt.-%, preferably 10-55 wt.-%, more preferably 15-45 wt.-% of the at least one elastomer.

According to one or more embodiments, the at least one elastomer preferably selected from the group consisting of butyl rubber, halogenated butyl rubber, ethylene-propylene diene rubber (EPDM), natural rubber, chloroprene rubber, synthetic 1,4-cis-polyisoprene, polybutadiene, ethylene-propylene rubber, styrene-butadiene copolymer, isoprene-butadiene copolymer, styrene-isoprene-butadiene rubber, methyl methacrylate-butadiene copolymer, methyl methacrylate-isoprene copolymer, acrylonitrile-isoprene copolymer, and acrylonitrile-butadiene copolymer, preferably from the group consisting of butyl rubber and halogenated butyl rubber.

According to one or more embodiments, the polymeric layer is the waterproofing layer of the sealing device according to the present invention.

Still another subject of the present invention is a method for waterproofing a substrate comprising steps of:

I. Applying two or more sealing devices according to the present invention on the surface of the substrate to be waterproofed, II. Overlapping adjoining sealing devices along the length and/or width of the sealing devices, III. Heating the overlapped portions of the sealing devices above the melting temperature of the waterproofing layer and bonding the opposing surfaces of the overlapped portions to each other under sufficient pressure to provide acceptable seam strength without use of adhesive.

According to one or more embodiments, the adjoining sealing devices are overlapped along the length and width of the sealing devices. According to one or more further embodiments, the adjoining sealing devices are overlapped at least 25 mm, preferably at least 50 mm, more preferably at least 75 mm, even more preferably at least 100 mm along the length and width of the sealing devices.

Step III. of the method for waterproofing a substrate can be conducted manually, for example by using a hot air tool, or by using an automatic welding device, such as an automatic hot-air welding device, for example Sarnamatic® 661 welding device. The temperature to which the overlapped portions of the adjoining sealing devices are heated depends on the embodiment of the sealing devices and also whether the welding step is conducted manually or by using an automatic welding device. Preferably, the overlapped portions of the adjoining sealing devices are heated to a temperature of at or above 150° C., more preferably of at or above 200° C.

According to one or more embodiments, the two or more sealing devices are applied on the surface of the substrate such that the exterior surface of the outer layer of non-woven fabric is directed against the surface of the substrate. The exterior surface of the outer layer of non-woven fabric refers here to the surface of the outer layer of non-woven fabric facing away from the waterproofing layer. The sealing devices can be adhered to the substrate using any conventional means, for example by mechanical fastening means, such as by using screws and/or barbed plates or by adhesive means, i.e. via a layer of an adhesive.

According to one or more embodiments, the substrate to be waterproofed is a roofing substrate, preferably selected from the group consisting of an insulation board, a cover board, and an existing roofing membrane.

DETAILED DESCRIPTION OF THE DRAWINGS

Figure 1:
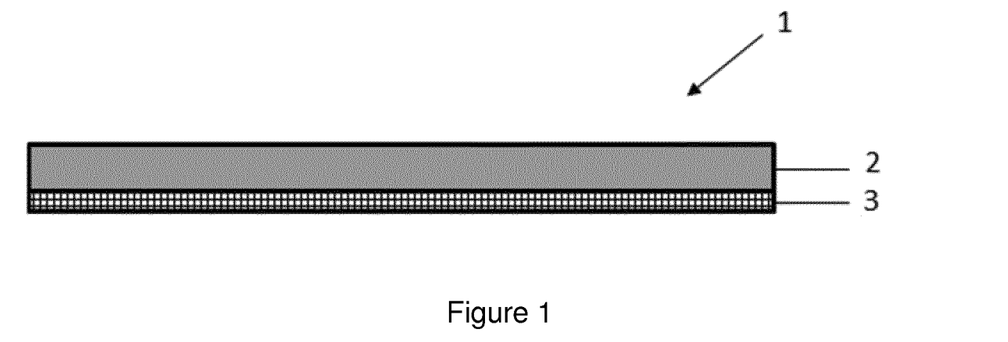
FIG. 1 shows a cross-section of a sealing device (1) comprising a waterproofing layer (2) and an outer layer of non-woven fabric (3) directly adhered to the second major surface of the waterproofing layer (2).

FIG. 1 shows a cross-section of a sealing device (1) comprising a waterproofing layer (2) and an outer layer of non-woven fabric (3) directly adhered to the second major surface of the waterproofing layer (2). In this embodiment, the outer layer of non-woven fabric (3) is directly adhered over its substantially entire surface to the second major surface of the waterproofing layer (2).

Figure 2:
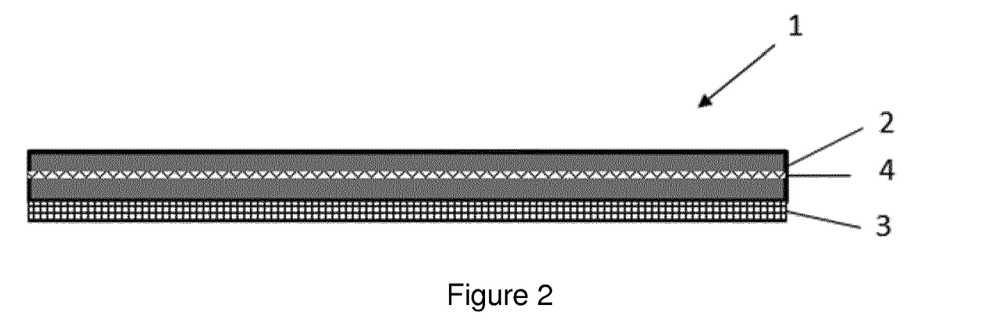
FIG. 2 shows a cross-section of a sealing device (1) comprising a waterproofing layer (2), an outer layer of non-woven fabric (3) directly adhered to the second major surface of the waterproofing layer (2), and a reinforcement layer (4), which is fully embedded into the waterproofing layer (2).

FIG. 2 shows a cross-section of a sealing device (1) comprising a waterproofing layer (3) and an outer layer of non-woven fabric (3) directly adhered to the second major surface of the waterproofing layer (2). In this embodiment, the sealing device (1) further comprises a reinforcement layer (4), which is fully embedded into the waterproofing layer (2) and the outer layer of non-woven fabric (3) is directly adhered over its substantially entire surface to the second major surface of the waterproofing layer (3).

Figure 3:
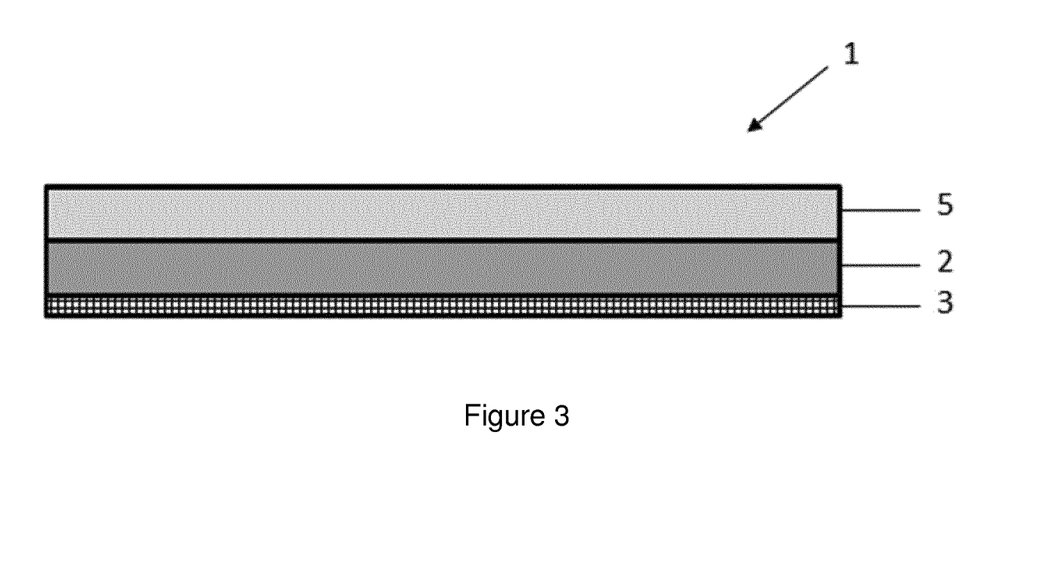
FIG. 3 shows a cross-section of a sealing device (1) comprising a waterproofing layer (2) and an outer layer of non-woven fabric (3) directly adhered to the second major surface of the waterproofing layer (2). In this embodiment, the sealing device (1) further comprises a top layer (5) located on the upward facing side of the waterproofing layer (2) opposite to the side of the outer layer of non-woven fabric (3).

FIG. 3 shows a cross-section of a sealing device (1) comprising a waterproofing layer (2) and an outer layer of non-woven fabric (3) directly adhered to the second major surface of the waterproofing layer (2). In this embodiment, the sealing device (1) further comprises a top layer (5) located on the upward facing side of the waterproofing layer (2) opposite to the side of the outer layer of non-woven fabric (3) and the outer layer of non-woven fabric (3) is directly adhered over its substantially entire surface to the second major surface of the waterproofing (2) layer.

Figure 4:
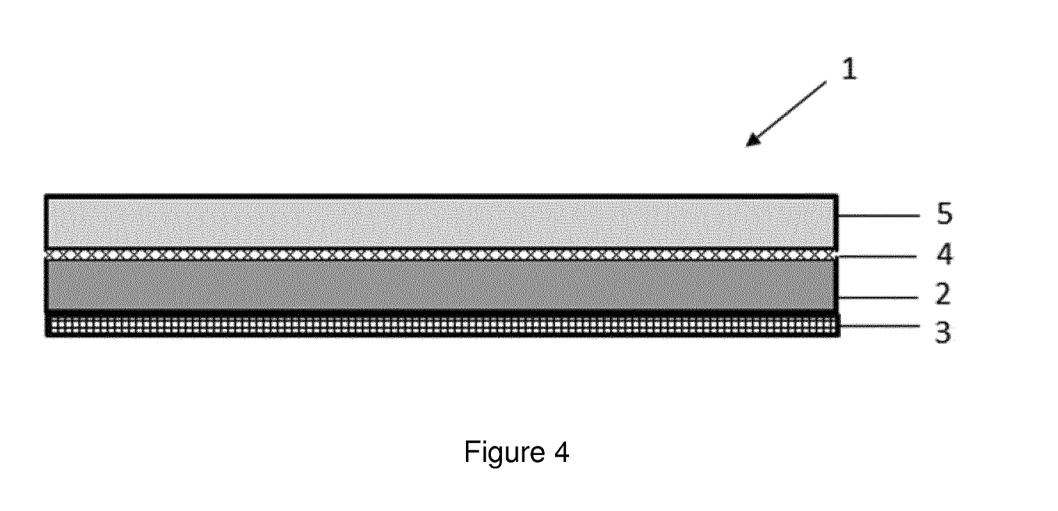
FIG. 4 shows a cross-section of a sealing device (1) comprising a waterproofing layer (2) and an outer layer of non-woven fabric (3) directly adhered to the second major surface of the waterproofing layer (2). In this embodiment, the sealing device (1) further comprises a top layer (5) located on the upward facing side of the waterproofing layer (2) opposite to the side of the outer layer of non-woven fabric (3) and a reinforcement layer (4) located between the top layer (5) and the waterproofing layer (2).

FIG. 4 shows a cross-section of a sealing device (1) comprising a waterproofing layer (2) and an outer layer of non-woven fabric (3) directly adhered to the second major surface of the waterproofing layer (2). In this embodiment, the sealing device (1) further comprises a top layer (5) located on the upward facing side of the waterproofing layer (2) opposite to the side of the outer layer of non-woven fabric (3) and a reinforcement layer (4) located between the top layer (5) and the waterproofing layer (2). Furthermore, the outer layer of non-woven fabric (3) is directly adhered over its substantially entire surface to the second major surface of the waterproofing layer (2).

Examples

Exemplary fleece-backed TPO membranes were prepared by thermally laminating a layer of non-woven fabric consisting of polypropylene fibers on the back surface of a commercially available TPO membrane and an in-house produced flexible TPO membrane. The weldability was tested with the prepared TPO membranes having different thicknesses of the non-woven fabric laminated on their back side. The results of the weldability test are shown in Table 2.

Sarnafil® TS 77 is a multilayer TPO-based roof waterproofing sheet available from Sika Schweiz AG.

The non-woven fabric composed of polypropylene fibers is available from RKW Hydrospun Germany under the trade name of RKW Hyjet®.

The flexible TPO membrane was produced according to the procedure as described below.

Preparation of Flexible TPO Membrane

The flexible membrane was produced using a laboratory scale extrusion-calendering apparatus consisting of a twin screw extruder (Berstorff GmbH), a flat die and set of water-cooled calender rolls.

In producing of the flexible TPO membranes, the thermoplastic elastomer component and the elastomer were fed to the extruder hopper. The blend was melt-processed in the first of the four zones of the extruder and an additive package containing a mixture of a catalyst, hindered amine light stabilizers (NOR-HALS), and flame retardants was added to the partially melt-processed blend at beginning of the second zone of the extruder. The melt-processed blend was then extruded through a flat die into single ply sheets having a thickness of approximately 0.8 mm. The extrusion was conducted using an extrusion temperature of ca. 185° C. and pressure of ca. 70 bar.

The components and their amounts fed into the extruder during the preparation of the flexible TPO membrane are shown in Table 1.

Weldability

Weldability of the example fleece-backed membranes was tested using a welding temperature of 400° C. and a welding speed of 3.5 m/min. A Sarnamatic 661 welding automat was used in welding the sheets. The weldability was considered as satisfactory (=OK) when in a tear testing, a break occurred outside of the welding seam between the joined sheets.

TABLE 1

| Component | Amount [wt.-%] | Composition | Provider |
|---|---|---|---|
| Hifax ® CA 10 | 13.55 | Reactor-blend TPO | LyondellBasell |
| Vistamaxx ® 6202 | 33.20 | Propylene-ethylene copolymer | Exxon Mobil |
| BB2030 ® | 21.01 | Bromobutyl rubber | Lanxess |
| SiloxActif ® E80 | 0.94 | Zinc oxide catalyst | Safic Alcan |
| Stearic acid | 0.24 | Stearic acid | Emery Oleochemicals |
| Thermal stabilizer | 0.07 | Thermal stabilizer | Ciba Specialty Chemicals |
| NOR-HALS 1 | 0.30 | Alkoxyamine HALS | Ciba Specialty Chemicals |
| NOR-HALS 2 | 0.20 | Alkoxyamine HALS | Ciba Specialty Chemicals |
| Alumina trihydrate | 28.46 | Al(OH)3 | Albemarle |
| Titanium dioxide | 2.03 | TiO2 | Kronos |

TABLE 2

| Membrane | Non-woven [g/m$^2$] | Weldability at 240° C., 3.5 m/min |
|---|---|---|
| Sarnafil TS 77 | 30 | Ok |
| Sarnafil TS 77 | 60 | Ok |
| Sarnafil TS 77 | 100 | Ok |
| Flexible TPO | 30 | Ok |

TABLE 2-continued

| Membrane | Non-woven [g/m²] | Weldability at 240° C., 3.5 m/min |
|---|---|---|
| Flexible TPO | 60 | Ok |
| Flexible TPO | 100 | Ok |

The invention claimed is:

1. A sealing device comprising:
   i) a waterproofing layer having a first and a second major surface and comprising at least one thermoplastic elastomer P1 and
   ii) an outer layer of non-woven fabric directly adhered over at least part of its surface to the second major surface of the waterproofing layer,
   wherein the outer layer of non-woven fabric comprises at least one polymer P2,
   wherein the outer layer of non-woven fabric is directly adhered over at least part of its surface to the second major surface of the waterproofing layer through thermal bonding without the use of an adhesive, and
   wherein the sealing device further comprises a top layer having a first and a second major surface located on the upward facing side of the waterproofing layer opposite the side of the outer layer of non-woven fabric.

2. The sealing device according to claim 1, wherein the at least one thermoplastic elastomer P1 and the at least one polymer P2 are compatible and/or at least partially miscible with each other.

3. The sealing device according to claim 1, wherein the at least one polymer P2 is selected from the group consisting of polypropylene and polypropylene copolymers.

4. The sealing device according to claim 1, wherein the outer layer of non-woven fabric has a mass per unit area (weight) of not more than 300 g/m².

5. The sealing device according to claim 1, wherein the outer layer of non-woven fabric forms one of the outermost layers of the sealing device.

6. The sealing device according to claim 1 further comprising a reinforcement layer fully embedded into the waterproofing layer, wherein the reinforcement layer comprises a non-woven fabric comprising inorganic and/or synthetic organic fibers and/or a non-woven scrim.

7. The sealing device according to claim 1 further comprising a reinforcement layer located between the top layer and the waterproofing layer,
   wherein the reinforcement layer comprises a non-woven fabric comprising inorganic and/or synthetic organic fibers and/or a non-woven scrim.

8. The sealing device according to claim 1, wherein the waterproofing layer has a thickness determined by using the measurement method as defined in DIN EN 1849-2 standard of 0.1-5.0 mm.

9. The sealing device according to claim 1, wherein the waterproofing layer is composed of a composition comprising:
   a) a thermoplastic elastomer component P and
   b) at least one elastomer E,
   wherein the thermoplastic elastomer component P comprises the at least one thermoplastic elastomer P1.

10. The sealing device according to claim 9, wherein the composition comprises, as polymer basis, 25-85 wt.-% of the thermoplastic elastomer component P and 5-60 wt.-% of the at least one elastomer E.

11. The sealing device according to claim 9, wherein the at least one elastomer E is selected from the group consisting of butyl rubbers and halogenated butyl rubbers.

12. A method for producing a sealing device according to claim 1, the method comprising steps of:
   I) providing a waterproofing layer as defined in claim 1, and
   II) adhering an outer layer of non-woven fabric as defined in claim 1 to the second major surface of the waterproofing layer by using thermal bonding means.

13. A method of using a layer of non-woven fabric as a sealing device, the method comprising:
   providing a layer of non-woven fabric having polypropylene fibers for reducing blocking of a polymeric layer having a first and a second major surface and comprising at least one propylene-based thermoplastic elastomer,
   directly adhering the layer of non-woven fabric over at least part of the non-woven fabric's surface to the first or second major surfaces of the polymeric layer through thermal bonding without the use of an adhesive,
   affixing a top layer having a first and a second major surface to a side of the polymeric layer opposite the side of the layer of non-woven fabric, and
   using the non-woven fabric as a sealing membrane for a roof system.

14. The method according to claim 13, wherein the layer of non-woven fabric has a mass per unit area (weight) of not more than 300 g/m².

15. The method according to claim 13, wherein the polymeric layer further comprises at least one elastomer.

16. The method according to claim 15, wherein the polymeric layer comprises, as polymer basis, 25-85 wt.-% of the at least one propylene-based thermoplastic elastomer and 5-60 wt.-% of the at least one elastomer.

17. A method for waterproofing a substrate comprising steps of:
   I. applying two or more sealing devices according to claim 1 on the surface of the substrate to be waterproofed,
   II. overlapping adjoining sealing devices along the length and/or width of the sealing devices,
   III. heating the overlapped portions of the sealing devices above the melting temperature of the waterproofing layer and bonding the opposing surfaces of the overlapped portions to each other under sufficient pressure to provide acceptable seam strength without use of adhesive.

18. The sealing device according to claim 1, wherein the at least one thermoplastic elastomer P1 is a propylene-based thermoplastic elastomer.

* * * * *